United States Patent

[11] 3,611,828

| [72] | Inventor | Max Maroshick<br>Glen Mills, Pa. |
|---|---|---|
| [21] | Appl. No. | 862,345 |
| [22] | Filed | Sept. 30, 1969 |
| [45] | Patented | Oct. 12, 1971 |
| [73] | Assignee | The Boeing Company<br>Seattle, Wash. |

[54] CHANNEL-SWITCHING DEVICE
11 Claims, 8 Drawing Figs.

[52] U.S. Cl. .................................................. 74/479,
74/480, 74/483, 244/84
[51] Int. Cl. ........................................................ G05g 11/00,
B64c 13/00, B64c 13/32
[50] Field of Search............................................ 74/479,
480, 483, 471, 526; 244/83, 84, 85; 287/DIG. 8

[56] References Cited
UNITED STATES PATENTS

| 2,503,498 | 4/1950 | Levy............................. | 74/479 |
| 2,641,395 | 6/1953 | Engle............................ | 74/526 |
| 3,055,445 | 9/1962 | Mendez......................... | 74/471 X |
| 3,368,351 | 2/1968 | Wood............................ | 244/84 |
| 3,451,287 | 6/1969 | Riviere......................... | 74/526 X |

Primary Examiner—William F. O'Dea
Assistant Examiner—Thomas R. Hampshire
Attorney—Finnegan, Henderson & Farabow ABSTRACT: A channel-switching device is provided that receives two mechanical input signals and transmits one of these signals as an output signal. The device includes a primary input assembly that normally transmits a primary signal to an output member and a secondary input assembly that normally receives a secondary signal but does not transmit the secondary signal to the output member. The primary input assembly includes a normally engaged, cam-type positive drive clutch and the secondary input assembly includes a similar, but normally disengaged clutch. Shift means are provided for simultaneously disengaging the clutch in the primary input assembly and engaging the clutch in the secondary input assembly after a failure in the primary input signal is sensed.

3,611,828

CHANNEL-SWITCHING DEVICE

FIELD OF THE INVENTION

This invention relates to a channel-switching device for use in a failure correction control system in which the switching device receives two mechanical input signals and transmits one of these signals as an output signal. More particularly, the invention relates to a channel-switching device which can disengage an output member from a mechanical linkage transmitting a primary signal, after a failure in the mechanical linkage, and also engage the output member and a mechanical linkage supplying a secondary input signal.

BACKGROUND OF THE INVENTION

The ever-increasing demand for reliability in controls for dirigible craft, such as airplanes, helicopters, spacecraft, ships, and the like, has led to a demand for redundant control systems; that is, control systems containing (a) two or more channels for transmission of a plurality of input signals, and (b) switching means for selectively transmitting an output signal that is proportional to one or more of the input signals.

While the switching device of this invention may be used in a number of mechanical control systems where redundancy is desired, it is particularly useful in control systems that incorporate two independent input signals with each of the signals being capable of driving an output member through its full desired range of travel. Upon failure of one of the independent input signals, the other input signal remains available for continued control of the output system at full authority.

The new channel-switching device can, for example, be incorporated in an aircraft control system in which a pilot's control stick activates two parallel independent linkages which form the inputs to the channel-switching device. The output from the channel-switching device comprises movement of an output control linkage. The invention assures a continuing output in the event the primary input control linkage fails.

Two types of failure are possible in a mechanical linkage system for transmitting a mechanical input signal—disconnect failures and jam failures. A typical disconnect failure occurs when one mechanical element in a linkage becomes operationally disengaged. The mechanical elements in the failed input linkage are generally free to move and do not adversely retard the movement of elements of a mechanical switching device to which the linkage is attached. However, the linkage does not transmit an effective mechanical signal to the channel-switching device.

A typical jam failure occurs when two adjacent parts of a mechanical linkage seize, thus locking the entire linkage in a certain position. A jam failure, besides terminating the transmission of an input signal, can have a further adverse effect on the performance of a channel-switching device to which it is connected, since the input element of the channel-switching device (the element which receives the input signal) may also be frozen or locked into position by a jam failure in the input linkage.

SUMMARY OF THE INVENTION

It is a primary object of this invention to provide a new and improved channel-switching device for use in a failure correction control system which contains a secondary input channel which acts as a standby and is held in readiness in the event a malfunction occurs in the primary input system.

Another object of this invention is to provide a channel-switching device which upon the failure of a primary input signal possesses the capability of simultaneously disengaging the output member from the linkage connecting it to the primary signal and engaging the output member to the secondary input signal.

Still another object of this invention is to provide a channel-switching device for use in a failure correction control system which does not require transient movement of the mechanical elements at the output of the device before being switched from a condition in which a primary signal is received and transmitted to a condition in which a secondary signal is received and transmitted.

A further object of this invention is to provide a reliable channel-switching device that can be used in a failure correction control system.

Additional objects and advantages of this invention will be set forth in the description which follows and in part will be obvious from the description, or may be learned by practice of the invention.

Broadly, the invention comprises a channel-switching device for use in a failure correction control system in which the switching device receives two mechanical input signals, a primary input signal, and a secondary input signal. The switching device includes a frame, an output means mounted on the frame for movement relative to the frame; a primary input assembly mounted on the frame including an input element for receiving the primary input signal, a primary clutch, and signal transmission means connecting the input element, the clutch, and the output means for transmitting the primary signal to the output means; a secondary input assembly including an input member mounted on the frame for receiving the secondary input signal, a secondary clutch, signal transmission means connecting the input member, the secondary clutch and the output means for transmitting the secondary signal to the output means when the secondary clutch is engaged; and shift means connected to said primary and said secondary input assemblies for disengaging said primary clutch and for engaging said secondary clutch after a failure occurs in the primary input signal.

Preferably, the signal transmission means of the primary input assembly includes a shaft rotably mounted on the frame; and the primary and secondary clutch means comprise cam-type, positive drive clutches in which a first cam is mounted for rotation relative to the shaft in response to an input signal; a second cam is fixed on the shaft for rotation therewith; a cam cage is movable between a position in which the cam cage engages each of the first and second cams and causes them to stay in angular alignment, and another position in which the cage is out of engagement with one of the cams.

DETAILED DESCRIPTION OF A PREFERRED EMBODIMENT

The accompanying drawings illustrate a preferred embodiment of the invention, and together with the description, serve to explain the principles of the invention.

Figure 1:
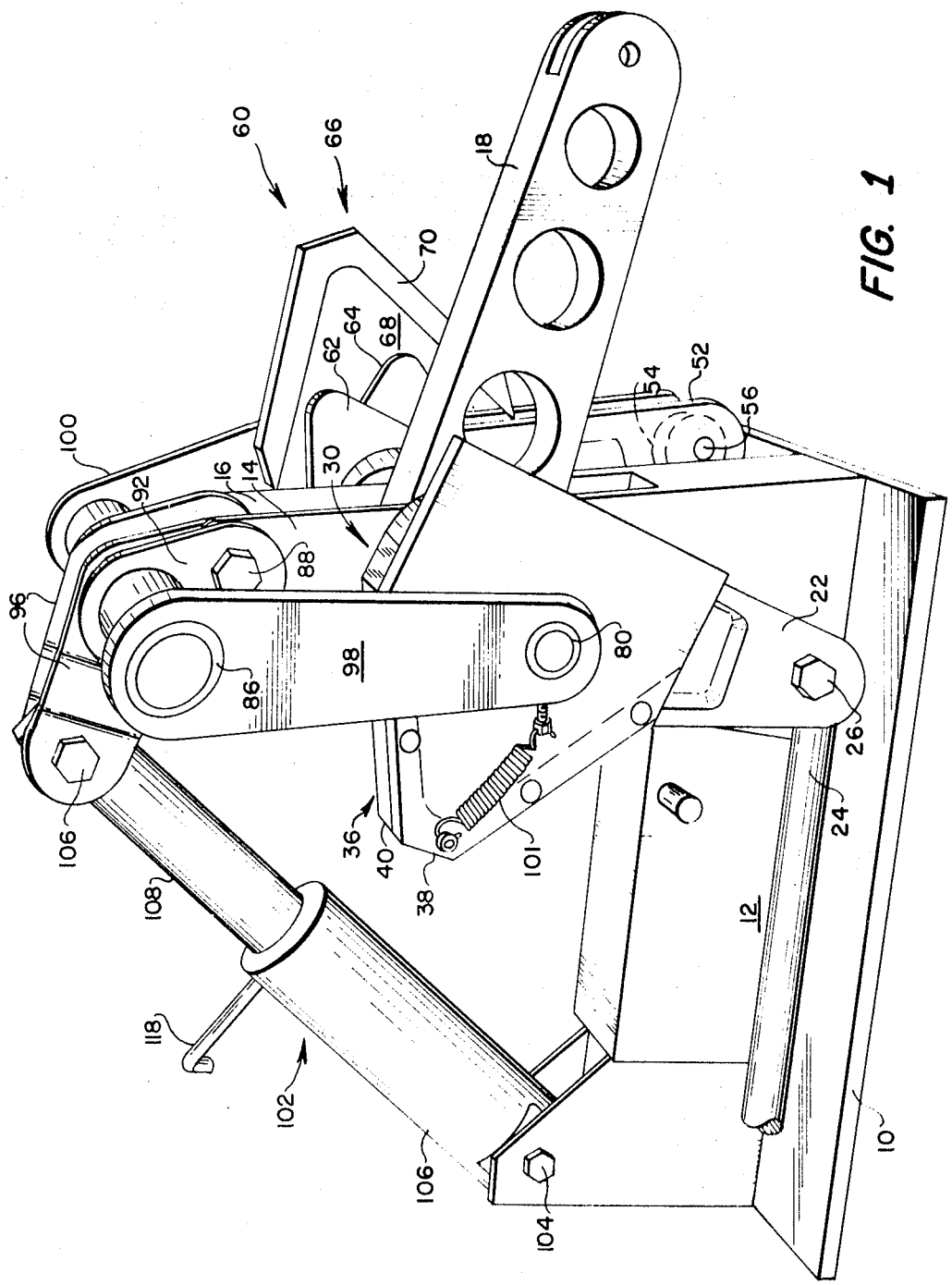
FIG. 1 is a perspective view of a channel-switching device constructed in accordance with the invention, and illustrating the elements of the device in position for receiving and transmitting an active primary signal.

In FIG. 1, the channel-switching device of this invention is illustrated mounted on a frame that includes a base 10 and a vertical strut 12 having two projecting arms 14 and 16. The elements of the frame are rigid and their positions are fixed in relation to each other.

An output means is mounted on the frame for movement relative to the frame. As here embodied, a single output member 18 is mounted for rotation relative to the frame by attaching the output member to a shaft 20, illustrated in FIGS. 2 and 6, that is pivotally mounted relative to the frame. Thus, the output from the channel-switching device is a rotary movement of output member 18 relative to the axis of shaft 20.

A single output member is desirable in a failure correction control system in which the final control element is not duplicated. However, it will be apparent that in a system including redundant final control elements, the output means would desirably comprise two distinct output members.

In accordance with the invention, a primary input assembly is mounted on the frame and includes an input element for receiving the primary input signal, a primary clutch, and signal transmission means connecting the input element, the primary clutch, and the output member for transmitting the primary signal to the output member. The primary clutch is preferably a cam-type positive drive clutch.

Figure 4:
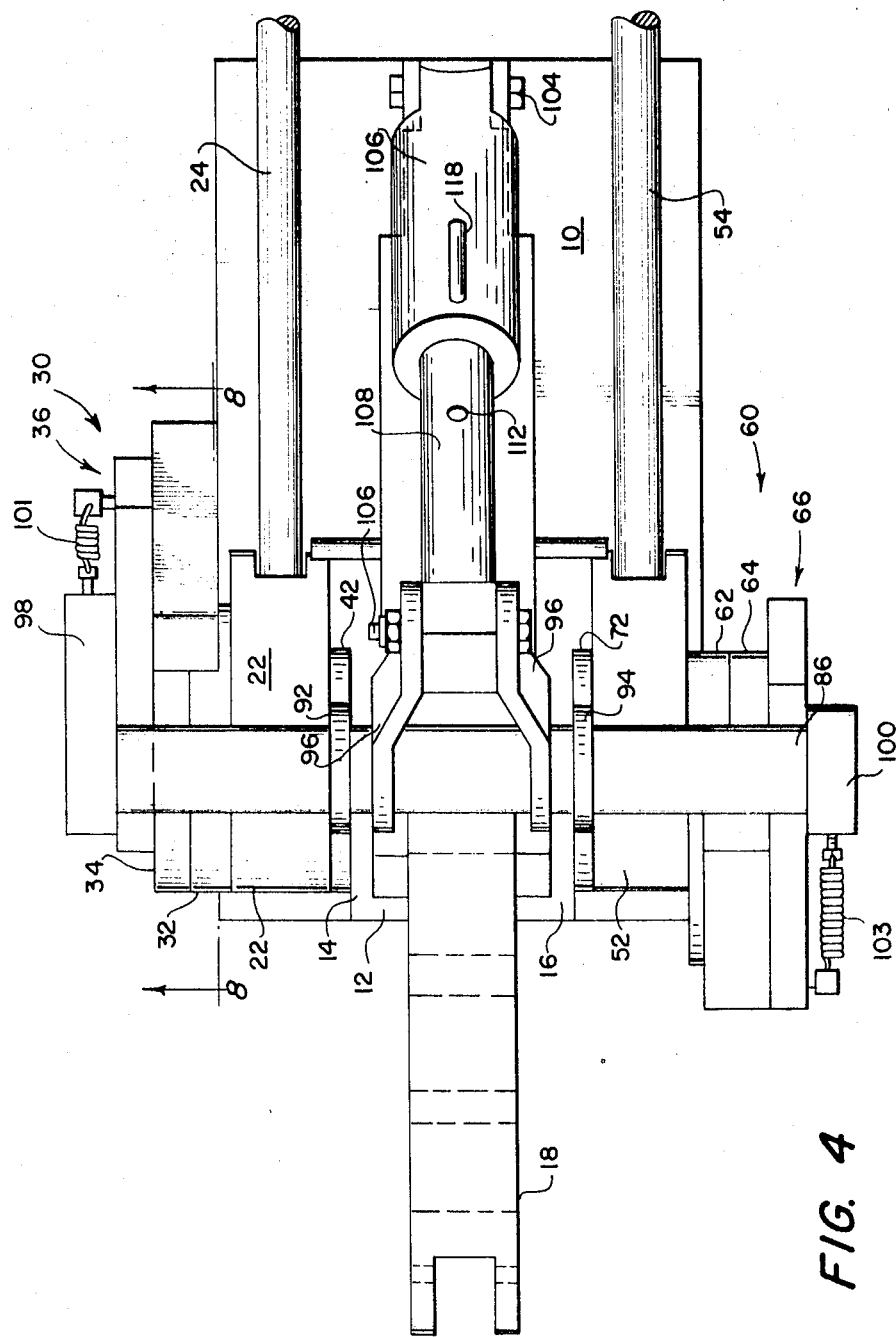
FIG. 4 is a plan view of the device illustrated in FIG. 3.

As here embodied, and as illustrated in FIGS. 1 and 4, the primary input assembly includes an input element 22 that receives the primary input signal from a terminal rod end 24 of a linkage supplying the primary input signal.

As shown in FIG. 1, the terminal rod end 24 is connected to input element 22 by a pivot pin 26 which permits some pivotal movement of input element 22 relative to terminal rod end 24, but the basic motion of input element 22 in response to the movement of arm 24 is a pivoting motion about shaft 20 because input element 22 is pivotally mounted on shaft 20. A pivoting motion of input element 22 does not, however, directly cause a pivoting movement of shaft 20.

Figure 3:
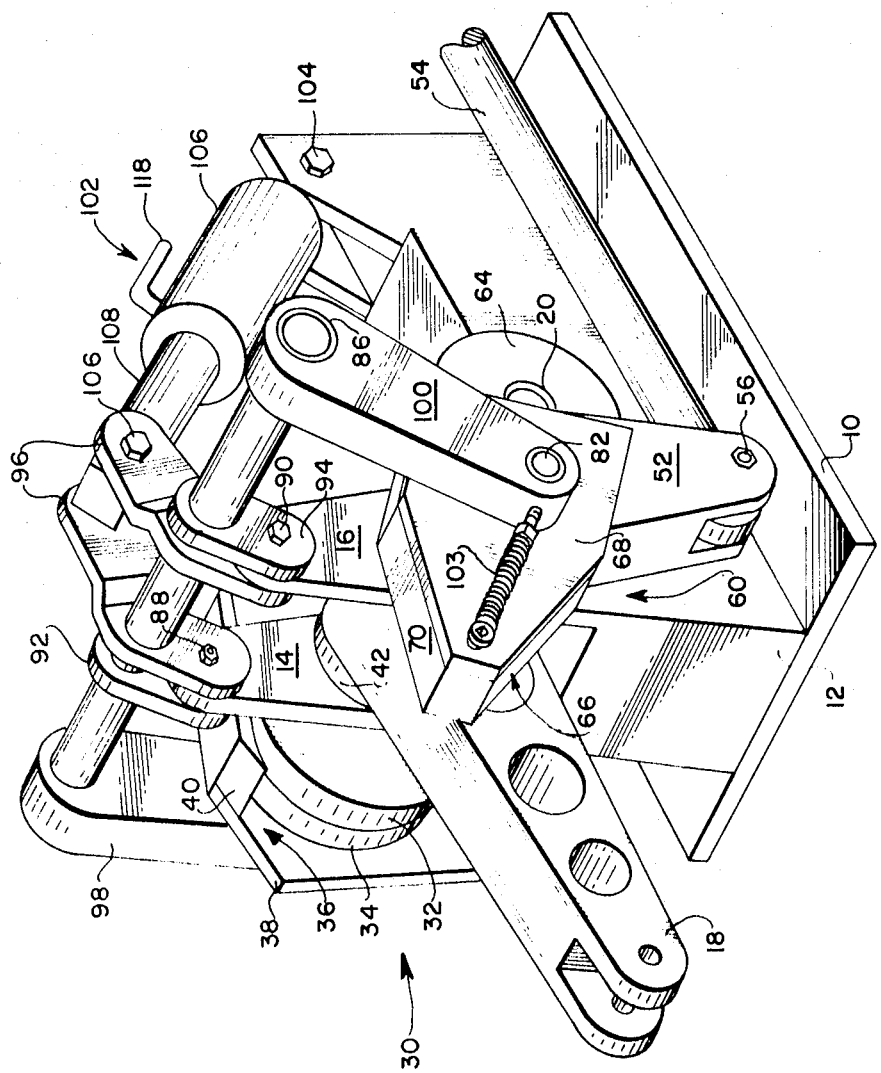
FIG. 3 is a perspective view of the channel-switching device of FIG. 1 and illustrates the elements of the device in position for receiving and transmitting the secondary signal after a failure has occurred in the primary signal.

A normally engaged primary clutch 30 is provided to transmit rotary motion of input element 22 to shaft 20. As best seen in FIG. 3, the primary clutch includes a first cam 32 that is pivotally mounted on shaft 20 for rotation relative to shaft 20. Cam 32 is attached to input element 22 by signal transmission means described below and is driven through a range of rotary movement by the input element with cam 32 and input element 22 staying in angular alignment.

Figure 8:
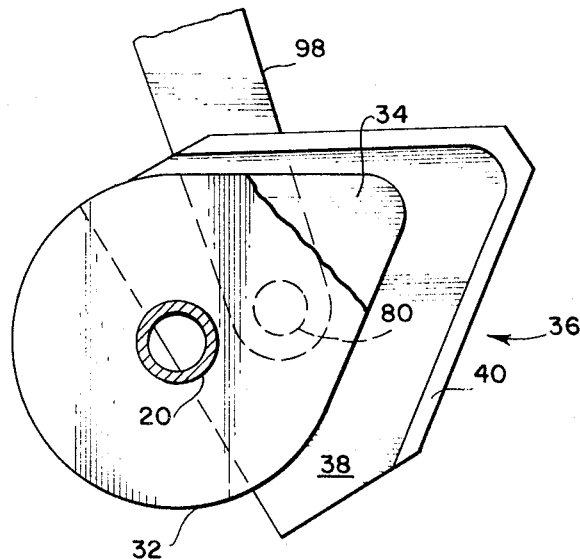
FIG. 8 is a vertical section taken along line 8—8 of FIG. 4 with part of one cam broken away.

A second cam 34 is fixed on shaft 20 for rotation with shaft 20. Each of the cams is generally disc shaped and each possesses the edge contours illustrated for cam 32 in FIG. 8. From the foregoing description, it can be seen that cams 32 and 34 do not inherently stay in angular alignment during reception of an input signal because cam 34 is driven by the shaft and cam 32 is not.

Figure 2:
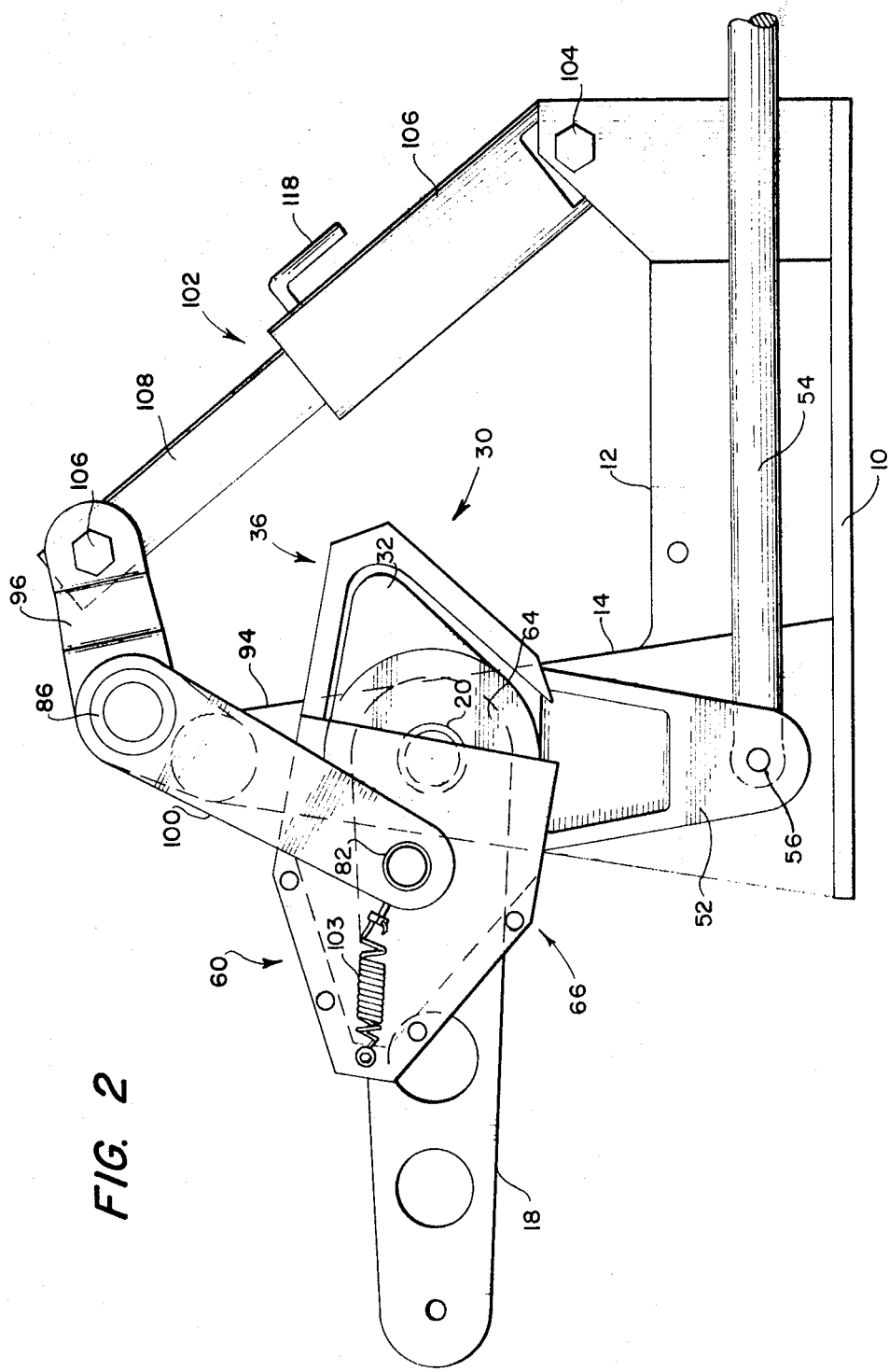
FIG. 2 is a rear elevation of the device of FIG. 1.

Clutch 30 also includes a cam cage generally 36 which is movable between a first position, as illustrated in FIGS. 1 and 2, in which the cam cage engages each of cams 32 and 34 and causes them to stay in angular alignments, and a second position, illustrated in FIGS. 3–6 in which the cam cage is out of engagement with these cams. Cam cage 36 includes a plate 38 and a concave member 40 which is rigidly attached to plate 38 and extends inwardly from plate 38 a distance which exceeds the thickness of second cam 34 so that the cam cage can engage the edge of both of cams 32 and 34. Concave member 40 has an internal surface which conforms to and is slightly larger than adjacent edge surfaces of generally disc-shaped cams 32 and 34.

Figure 6:
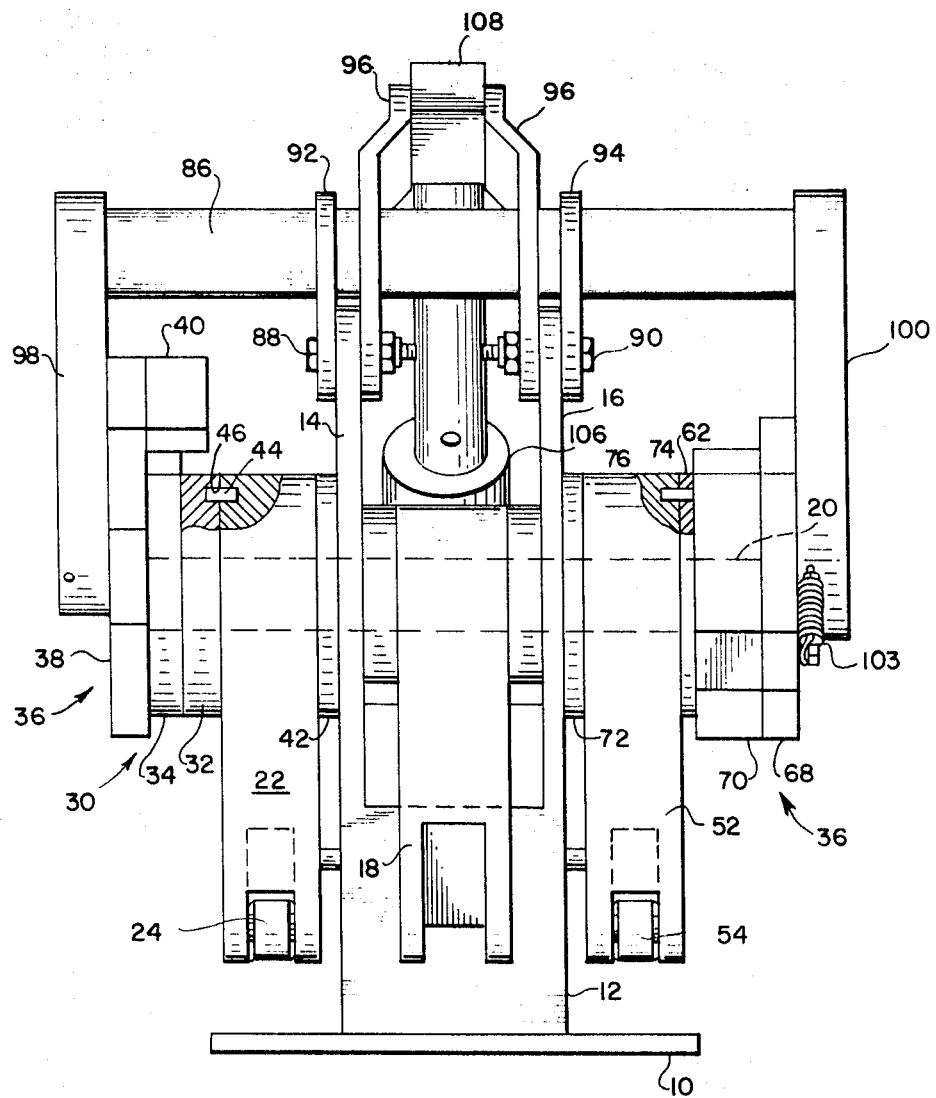
FIG. 6 is a front elevation of the device of FIG. 3.

The primary input assembly further includes signal transmission means which connect input element 22, primary clutch 30, and output member 18 for transmitting the mechanical forces comprising the primary signal to output member 18. As here embodied, and as best illustrated in FIG. 6 the signal transmission means comprise a pin 44 which is inserted in a keyway 46 that extends across and connects the adjacent surfaces of input element 22 and cam 32; and shaft 20 that connects clutch 30 and output member 18. Pin 44 permits input element 22 to drive cam 32 and thus pivot cam 32 about shaft 20. When the primary clutch is engaged, motion of cam 32 is transferred to cam 34 through cam cage 36. Thus, the pivoting motion of input element 22 in response to changes in the input signal is transferred to cam 34 which is affixed to shaft 20. Since output member 18 is fixed on shaft 20, turning forces applied by cam 34 on shaft 20 cause output member 18 to rotate about the axis of shaft 20.

In accordance with the invention, a secondary input assembly is mounted on the frame and includes an input element for receiving the secondary input signal; a secondary clutch means; and signal transmission means connecting the input element, the secondary clutch means, and the output member for transmitting the secondary signal to the output member. The secondary clutch means is preferably a cam-type, positive drive clutch. As here embodied, and as illustrated in FIG. 3, the secondary input assembly includes an input element 52 that receives the primary input signal from a terminal rod end 54 of a linkage supplying the primary input signal. As shown in FIG. 3, terminal rod end 54 is connected to input member 52 by a pivot pin 56 which permits some pivotal movement of input member 52 relative to rod end 54, but the basic motion of input member 52 in response to movement of rod end 54 is a pivoting motion about shaft 20 because input member 52 does not directly cause angular movement of shaft 20 since member 52 is pivotable relative to shaft 20.

A normally disengaged secondary clutch 60 is provided to transmit rotary motion of input member 52 to shaft 20. As best illustrated in FIG. 4, the secondary clutch includes a first cam 62 and a second cam 64 and a cam cage generally 66. Cam 62 is pivotally mounted on shaft 20 for rotation relative to shaft 20. Cam 62 is attached to input member 52 by signal transmission means, described below, and is driven through a range of rotary movement by the input member with cam 62 and input member 52 staying in angular alignment. Second cam 64 is fixed on shaft 20 for rotation with shaft 20.

Cam cage 66 is movable between a first position, as illustrated in FIGS. 1 and 2, in which cam cage 66 is out of engagement with cams 62 and 64 and a second position, illustrated in FIGS. 3–6 in which cam cage 66 engages each of these cams and causes them to stay in angular alignment. Cam cage 66 includes a plate 68 and a concave member 70 which is rigidly attached to plate 68 and extends inwardly from plate 68, a distance which exceeds the thickness of second cam 64, so that it can engage the edge surface of both of cams 62 and 64. Concave member 70 has an internal surface which conforms to and is slightly larger than the adjacent edge surfaces of the generally disc-shaped cams it engages.

Movement of cam cage 66 to its second (engaged) position causes concave member 70 to contact the edge surfaces of cams 62 and 64. The position of cam 62 is fixed by input member 52. Thus, cam cage 66 moves into alignment with cam 62 and also forces cam 64 into alignment with cam 62.

The secondary input assembly further includes signal transmission means which connect input member 52, secondary clutch 60 and output member 18 for transmitting the mechanical forces comprising the primary signal to output member 18. As here embodied, and as illustrated in FIG. 6, the signal transmission means comprises a pin 74 which is inserted in a keyway 76 that extends across the adjacent surfaces of input element 52 and cam 62, and shaft 20 that connects clutch 60 and output member 18.

Pin 74 permits input member 52 to pivot cam 62 about shaft 20. When the secondary clutch is engaged, the pivoting motion of input member 52 in response to changes in the input signal is transferred to cam 62. The transmission of forces in response to an input signal to the secondary clutch is identical to the operation of the primary clutch described above.

In accordance with the invention, shift means are provided for disengaging the primary clutch and for engaging the secondary clutch. The shift means, by causing the engagement of the secondary clutch provides a complete force transmission channel for the secondary input signal to drive the output element after a failure has occurred in the linkage supplying the primary input signal.

As here embodied, the shift means includes a pivot pin 80 fixed on cam cage 36 as illustrated in FIG. 1, and a pivot pin 82 fixed on cam cage 66 as illustrated in FIG. 3, and positioning means which connect the frame and pivot pins 82 and 84 for selectively aligning one of the pins with shaft 20 to permit one cam cage to remain in angular alignment with the cams of its assembly and for selectively moving the other cam cage out of engagement with the cams of its assembly. In the present embodiment the positioning means include a shifting shaft 86, and arms 92 and 94 and yoke arms 96 that connect shaft 86 and pivot pins 88 and 90 on the frame. Shaft 86 is spaced from and aligned parallel with shaft 20.

One end of a lever arm 98 and one end of a lever arm 100 are fixed on opposite ends of shaft 86 for rotation therewith. The other ends of lever arms 98 and 100 are pivotally mounted on pins 80 and 82, respectively. It should be noted that lever arms 98 and 100 move in parallel planes about the axis of shifting shaft 86. However, as illustrated in FIGS. 1–3, arms 98 and 100 are angularly offset from each other when viewed along the axis of shaft 86. The distance between the axis of shaft 86 and the axis of shaft 20 can be made to equal the distance between shaft 86 and the axis of either one of pivot pins 80 or 82 so that the axis of either one of the pivot pins can be aligned with the axis of shaft 20. It should be noted that the axis of shaft 86 is capable of movement along an arcuate path with respect to the axis of lines 88 and 90.

As here embodied, and as best shown in FIG. 1, biasing means, such as a spring 101 which is normally in tension, connects cam cage 36 and lever arm 98 to ensure that cam cage 36 cannot be moved out of engagement with the cams by merely the pivoting motion of cam 32 in response to input signals. A second spring 103 is provided to connect cam cage 66 and lever arm 100 to insure that cam cage 66 cannot be moved out of engagement with the cams by the pivoting motion of cam 62 in response to input signals.

The positioning means of the present embodiment also includes a spring-loaded actuator, generally 102, for moving the shifting shaft from its normal position in which it holds the primary clutch in engagement to a second position in which the secondary clutch is engaged and the primary clutch is disengaged.

A pivot pin 104, illustrated in FIG. 3, connects one end of actuator 102 and the frame end permits the actuator to pivot with response to the frame. The other end of the actuator is pivotally connected to yoke arms 96 by a yoke pin 106.

Figure 7:
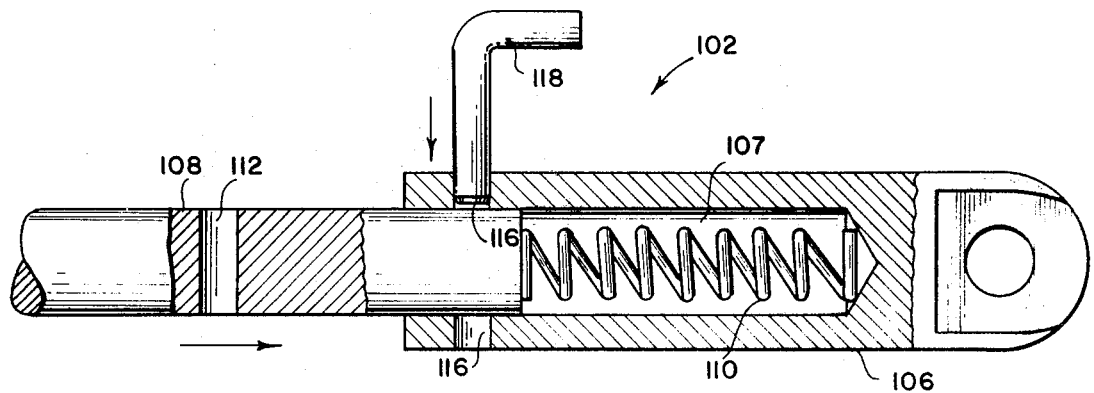
FIG. 7 is a partly sectioned view of the shift means illustrated in FIG. 3.

As may be seen in FIG. 7, actuator 102 includes a base member 106, a rod 108 that can be inserted in a central opening 107 in member 106, and a spring 110, seated in central opening 107, for urging rod 108 axially away from base member 106. A slot 112 extends across rod 108 and can be aligned with openings 116 that extend across base member 106 to permit insertion of a pin 118 through one opening 116, through slot 112 in rod 108 and through the other opening 116 to permit the fixing of the position of rod 108 in relation to base member 106 with spring 110 in a compressed condition.

Removal of pin 118 from the slot permits rod 108 to move to the left (as viewed in FIG. 7) and causes the simultaneous engagement of the secondary clutch and the disengagement of the primary clutch, as described below.

Figure 5:
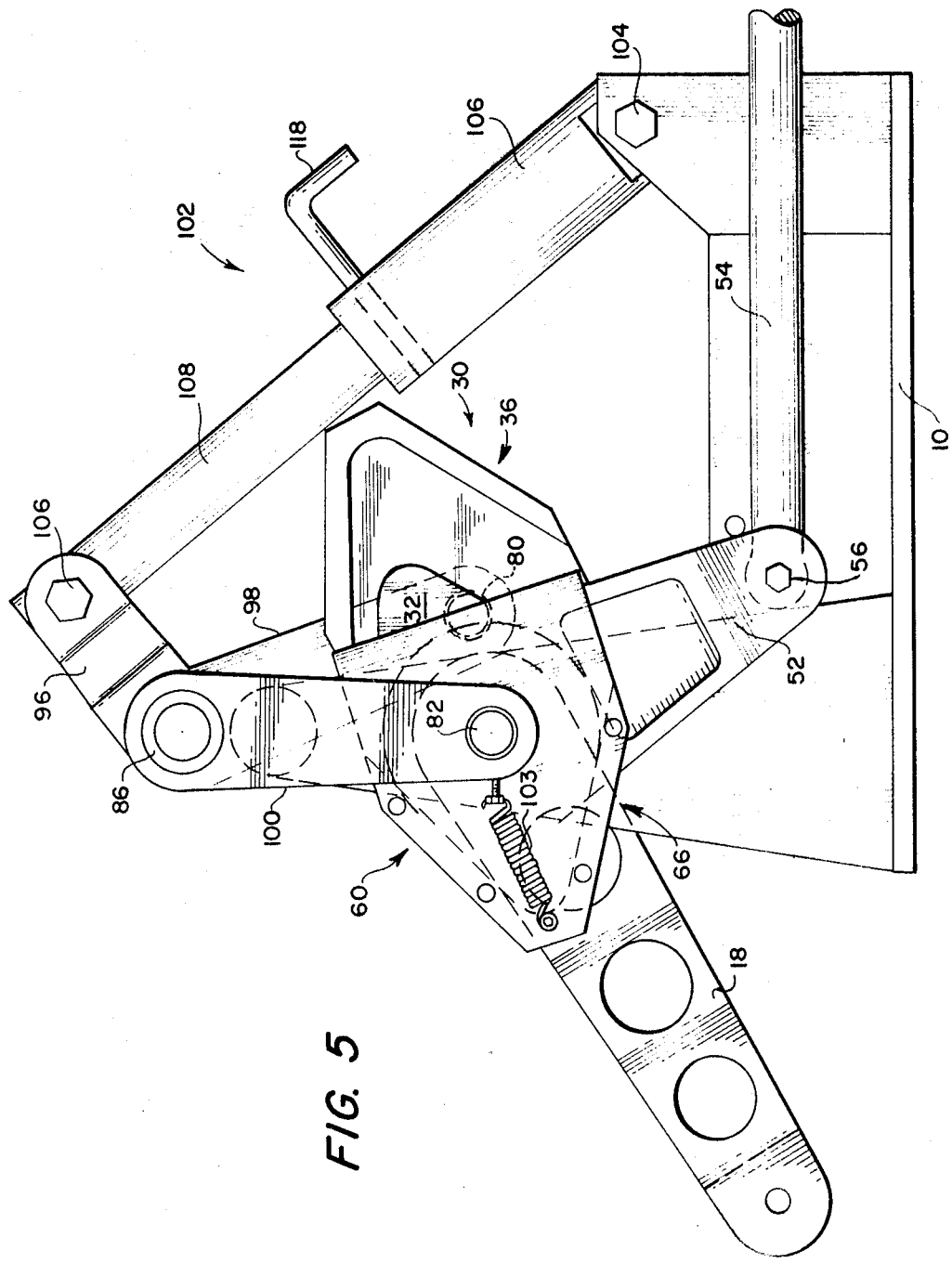
FIG. 5 is a rear elevation of the device illustrated in FIG. 3.

As here embodied and as illustrated in FIGS. 5 and 6, input element 22 and input member 52 are mounted on shaft 20. Washers 42 and 72 which are also mounted on shaft 20 about the inner face of element 22 and member 52 respectively. The washers help prevent excessive friction between stationary arms 14 and 16 of the frame and input element 22 and input member 52 respectively. It should be noted that the distance between arms 98 and arms 100 should exceed the combined thickness of plates 38 and 68, cams 32, 34, 62 and 64, input element 22, input member 52, washers 42 and 72, arms 14 and 16, and output element 18 so that the sides of these members can slip with respect to relative movement of the adjacent member without generating excessive frictional forces. Preferably, the above-described members which are positioned between arms 98 and 100 are constructed of metals or plastics which can be formed to provide low-friction surfaces.

While this invention has been described in a simplified environment for ease in understanding, it will be apparent to those skilled in the art that in most practical applications of the channel-switching device in failure correction control systems, it will be desirable to incorporate into the system an automatic device, such as a hydraulic or electrical actuator for actuating the shift means when a failure is sensed. While the lack of response of the final control element will ordinarily call attention to a failure, it may be desirable to provide an automatic device for sensing a failure in the linkage supplying the primary input.

The operation of the channel-switching device, as installed in a control system which supplies two mechanical input signals to the device will now be described.

With reference to FIG. 1, during normal operations, an active primary input signal is transmitted to input element 22 by rod end 24 of a mechanical linkage supplying the primary input signal. Changes in the primary input signal cause rotation of input element 22 about shaft 20 which is illustrated in FIG. 2. The primary clutch means are engaged due to the engagement of cam cage 36 with both of cams 32 and 34. Thus, rotary movement of cam 32 which is directly driven by input element 22 will transmit a turning force through cam cage 36 to cause rotary movement of cam 34 and also shaft 20 to which cam 34 is fixed. The rotary movement of shaft 20 in response to changes in the primary input signal moves output member 18, which is fixed on shaft 20, through it desired range of travel.

As illustrated in FIG. 1, during normal operation of the system, pin 118 is holding rod 108 and base member 106 of the actuator together. In this condition spring 110 is held in a compressed position rather than the expanded position illustrated in FIG. 7.

It should also be noted that during normal operation, secondary clutch 60 is disengaged as shown in FIG. 1. Thus, although secondary input member 52 is receiving a signal, it cannot transmit this signal to output member 18 due to the disengaged condition of clutch 60.

If a failure occurs in the linkage supplying the primary input signal to input element 22, the failure is sensed and then the shift means are moved to disengage the primary clutch and engage the secondary clutch.

The engagement of clutch 60 permits the secondary input signal which is continuously being received by input member 52 to be transmitted to output member 18. The disengagement of primary clutch 30 prevents a jam failure from freezing the position of output member 18 and the force transmission means connecting secondary clutch 60 and output element 18.

Specifically, the disengagement of primary clutch 30 is accomplished by removing pin 118 illustrated in FIG. 1 from slot 112 in base member 106 to permit spring 110, illustrated in FIG. 7, to extend and move rod 108 to the right with respect to FIG. 1. Yoke arms 96 and shaft 86 are thus pivoted in a clockwise direction about pins 88 and 90 and the frame. The pivoting movement of shaft 86 causes arm 98 and cam cage 36 to pivot in a clockwise direction and the cam cage disengages from cams 32 and 34 and assumes a position best illustrated in FIG. 8. After the disengagement of the cam cage from the cams, shaft 20 is free to pivot even if there has been a jam failure in the primary input linkage.

The same pivoting movement of shaft 86 about pins 98 and 100 that disengages the primary clutch also engages the secondary clutch by pivoting cam cage 66 in counterclockwise direction from the position illustrated in FIG. 1 to the position illustrated in FIG. 3.

In the engaged position for the secondary clutch shown in FIGS. 3–6, cam cage 66 engages both cams 62 and cam 64 and keeps these cams in angular alignment.

After engagement of the secondary clutch, movement of input member 52, in response to the secondary input signal, moves output element 18 through its normal range of movement. In the illustrated embodiment, the transmission of force from rod end 54 to the output member 18 follows the same sequence of elements in the secondary input assembly as is described above in regard to transmission of the primary signal through the primary input assembly.

In summary, the invention provides a channel-switching device for use in a failure correction control system in which a primary and a secondary input signal are transmitted to the switching device. During ordinary operation of the control system, the channel-switching device receives the primary signal and transmits this primary signal as an output, and also receives the secondary input signal but does not transmit the secondary signal to the output member. After a jam or disconnect failure has been detected in the primary input signal, the channel-switching device disengages the primary input from the output, and engages the secondary input signal and the output.

The channel-switching device possesses the ability to shift input channels without loss of output authority, and without requiring transient movement of the output element before shifting can be accomplished. The mechanism is capable of correcting for either jam or disconnect failures in a mechanical linkage supplying the primary input. Because the channel-switching device can be constructed to be rugged and reliable, it can be used in control systems where maximum reliability is required. Further, the device can be fully automated so that it senses the failure of an input signal and automatically compensates for this failure.

The invention in its broader aspects is not limited to the specific details shown and described, but departures may be made from such details without sacrificing its chief advantages.

I claim:

1. A channel-switching device for use in failure correction control system in which the switching device receives two mechanical input signals, a primary input signal, and a secondary input signal, said switching device comprising:
   a. a frame;
   b. an output means mounted on said frame for movement relative to said frame;
   c. a primary input assembly mounted on said frame including an input element for receiving the primary input signal; a primary clutch; and signal transmission means connecting said input element, said clutch, and said output means for transmitting the primary signal to the output means;
   d. a secondary input assembly including an input member mounted on said frame for receiving the secondary input signal; a secondary clutch; and signal transmission means including a shaft rotatably mounted on said frame, said signal transmission means connecting said input member, said secondary clutch, and said output means for transmitting said secondary signal to said output means when said secondary clutch is engaged;
   e. shift means connected to said primary and said secondary input assemblies for disengaging said primary clutch and for engaging said secondary clutch after a failure occurs in the primary input signal; and
   f. said secondary clutch comprising a first cam mounted on said shaft for rotation relative to said shaft in response to said secondary input signal, a second cam fixed on said shaft for rotation therewith, and cam cage means connected to said shift means for moving said second cam into alignment with said first cam and causing the angular position of said shaft in said signal transmission means of said secondary input assembly, and the output signal, to immediately reflect the secondary input signal when said secondary clutch is engaged.

2. The invention of claim 1 in which said signal transmission means of said primary input assembly includes said shaft and said primary clutch comprises a first cam mounted for rotation relative to said shaft in response to said primary input signal; a second cam fixed on said shaft for rotation therewith; and cam cage means connected to said shift means for engaging each of said first and second cams and causing them to stay in angular alignment when said primary clutch is engaged and for disengaging from said first cam when said primary clutch is disengaged.

3. The invention of claim 2 in which said shift means comprises a pivot pin fixed to said cam cage means of said primary input assembly; positioning means connecting said pin and said frame for coaxially aligning said pin with said shaft to cause said cam cage means to remain in angular alignment with said cams of said primary clutch and thereby engage said primary clutch, and for moving the axis of said pin to a line spaced from the axis of said shaft, to move said cam cage means out of engagement with said first cam and thereby disengage said primary clutch.

4. The invention of claim 2 in which said input element and said input member are mounted on said shaft for rotation relative to said shaft in response to said primary signal and said secondary signal, respectively; and said output means is mounted on said shaft for rotation therewith.

5. The invention of claim 1 in which said first and second cams are of the same peripheral size and shape and said cam cage means includes an open-ended concave member having an internal surface which conforms to and is slightly larger than the adjacent edge portions of said cams, said internal surface engaging said edge portions of each of said cams when said secondary clutch is engaged.

6. The invention of claim 5 including biasing means connecting said cam cage means and said positioning means for preventing movement of said cam cage means out of engagement with said cams, when said secondary clutch is engaged, by a mere pivoting motion of said first cam in response to the secondary input signal.

7. A channel-switching device for use in a failure correction control system in which the switching device receives two mechanical input signals, a primary input signal and a secondary input signal, said switching device comprising:
   a. a frame;
   b. an output member mounted for rotational movement relative to said frame in response to one of said input signals;
   c. a primary input assembly on said frame including an input element mounted for rotation relative to said frame in response to the primary input signal; a normally engaged primary clutch; and signal transmission means connecting said input element, said primary clutch and said output member for transmitting the primary signal to said output member;
   d. a secondary input assembly including an input member mounted for rotation relative to said frame in response to the secondary input signal; a normally disengaged secondary clutch; signal transmission means including a shaft rotatably mounted on said frame, said signal transmission means connecting said input member, said normally disengaged clutch, and said output member for transmitting said secondary input signal to said output member when said secondary clutch is engaged;
   e. a shift means connected to said primary and said secondary input assemblies for disengaging said primary clutch and simultaneously engaging said secondary clutch after a failure occurs in the primary input signal; and
   f. said secondary clutch comprising a first cam mounted on said shaft for rotation relative to said shaft in response to said secondary input signal, a second cam fixed on said shaft for rotation therewith, and cam cage means connected to said shift means for moving said second cam into alignment with said first cam and causing the angular position of said shaft in said signal transmission means of said secondary input assembly, and the output signal, to immediately reflect the secondary input signal when said secondary clutch is engaged.

8. The invention of claim 7 in which said signal transmission means of said primary input assembly includes said shaft and said normally engaged primary clutch comprises a first cam mounted for rotation relative to said shaft in response to said primary input signal; a second cam fixed on said shaft for rotation therewith; and cam cage means connected to said shift means for engaging each of said first and second cams and causing them to stay in angular alignment when said primary clutch is engaged, and for disengaging from said first cam when said primary clutch is disengaged.

9. The invention of claim 8 in which said shift means comprises a pivot pin fixed to said cam cage means of said primary clutch and positioning means connecting said pin and said frame for aligning said pin with said shaft to cause said cam cage means to remain in angular alignment with said cams of said primary clutch and thereby engage said primary clutch; and for moving said cam cage means out of engagement with said first cam to disengage said primary clutch.

10. The invention of claim 7 in which said input element and said input member are mounted on said shaft for rotation relative to said shaft in response to said primary signal and said secondary signal, respectively; and said output member is mounted on said shaft for rotation therewith.

11. The invention of claim 8 in which said shift means comprises a shifting shaft rotatably mounted on said frame, a pair of positioning arms each having one end fixed on said shifting shaft for rotation by said shifting shaft with the other end pivotally mounted on one of said cam cage means; and actuator means for moving the axis of said shifting shaft with respect to said frame between a first position in which said primary clutch is engaged and said secondary clutch is disengaged, and a second position in which said primary clutch is disengaged and said secondary clutch is engaged.